United States Patent Office 3,132,033
Patented May 5, 1964

---

3,132,033
FIBERIZABLE GLASS COMPOSITIONS
Ralph L. Tiede, Newark, Ohio, assignor, by mesne assignments, to the United States of America as represented by the United States Atomic Energy Commission
No Drawing. Filed Mar. 15, 1960, Ser. No. 15,072
42 Claims. (Cl. 106—50)

This invention relates to glass compositions and more specifically to suitable compositions for forming glass fibers.

A great deal of work has been accomplished related to finding specific glass compositions which include thorium oxide as an essential ingredient, which compositions are especially suited for use in chemical processing and as nuclear fuels. Although it was recognized earlier that thorium oxide containing glass compositions could be used for such purposes, the actual fiberizable glass compositions have been provided now for the first time and are for the first time disclosed herein.

In order for the compositions to be suitable for use in the production of fibers, they must meet an exacting set of standards. Fiber production, according to present-day high speed methods, requires that a glass melt be produced either from marbles, cullet or from basic raw materials. In either event, a rather substantial amount of molten glass is maintained for discharge in fine streams through orifices in feeders, commonly called bushings, the streams then being attenuated in any of numerous manners into the fine fibers desired. Continuous fibers which are pulled and wound upon a collet winder have been produced from the compositions of the present invention. This process is well-known to all those skilled in the art. The invention herein relates not to process but rather the inventive concept relates directly to the specific glass compositions which provide the necessary viscosity-temperature relationships to allow fiberization and also provide the desired physical properties such as durability and strength which have been found necessary in compositions which are to be manufactured into fibers.

Glass as it is commonly known is a super-cooled liquid and is not in an equilibrium condition. As ordinary glass is heated from room temperature, it passes through a range of temperatures at which it softens, first to a relatively viscous liquid condition. Further heating of glass above the softening range eventually brings it to a liquidus or maximum devitrification temperature. Above the liquidus temperature the glass exists, under equilibrium conditions, as a liquid. Below such temperature, glass exists at equilibrium, in a crystalline state. At temperatures just below the liquidus, devitrification occurs at a rapid rate. Glass to be fiberized must be melted and must also be maintained at 100° or so above its liquidus in order to prevent devitrification or even partial devitrification which might occur in the melting tank or in the vicinity of the bushing or feeder if a lower temperature were maintained.

The range of temperatures available in commercial production for fiberization, therefore, is between the liquidus temperature of the glass being fiberized and the maximum permissible operating temperature of the feeder. In order to be suited for the production of glass fibers by commercial techniques, glass must have a liquidus temperature substantially lower than the maximum permissible operating temperature of a feeder which is usually from about 2500° to about 2800° F. and preferably is not higher than about 2600° F. The glass must have a viscosity suitable for fiberization at a temperature above its liquidus temperature but below such maximum bushing operating temperature.

It is an object of this invention to provide glass compositions having a high proportion of thorium oxide as an essential ingredient.

It is a further object to provide compositions of the silica, soda, thoria system which are fiberizable by known methods and which can be produced economically and commercially.

Further objects will be apparent from the many examples and from the description which follows.

Glass compositions of the silica, soda, thoria system which include from about 5–35% by weight thoria are illustrated in the following examples that set forth suitable compositions for the purposes of the invention.

These glass compositions have the following ranges of proportions:

|  | Percent |
|---|---|
| $SiO_2$ | 24–70 |
| $Na_2O$ | 5–35 |
| $ThO_2$ | 15–35 [1] |

[1] 9–35 preferred.

It will be noted that in some of the examples both thoria and urania are added.

The following are examples of specific compositions that have been melted and are fiberizable by known processes.

Example I

|  | Percent |
|---|---|
| $SiO_2$ | 69.93 |
| $Al_2O_3$ | .07 |
| $Na_2O$ | 9.99 |
| $Fe_2O_3$ | .03 |
| $ThO_2$ | 19.98 |

Example II

| | |
|---|---|
| $SiO_2$ | 59.95 |
| $Al_2O_3$ | .06 |
| $Na_2O$ | 19.98 |
| $Fe_2O_3$ | .03 |
| $ThO_2$ | 19.98 |

Example III

| | |
|---|---|
| $SiO_2$ | 49.86 |
| $Al_2O_3$ | .05 |
| $Na_2O$ | 29.98 |
| $Fe_2O_3$ | .02 |
| $ThO_2$ | 19.99 |

Bushing operating temperature 2810° F.
Fiber diameter .00035".

Example IV

|  | Percent |
|---|---|
| $SiO_2$ | 59.95 |
| $Al_2O_3$ | .06 |
| $Na_2O$ | 9.99 |
| $Fe_2O_3$ | .03 |
| $ThO_2$ | 29.97 |

Example V

| | |
|---|---|
| $SiO_2$ | 49.96 |
| $Al_2O_3$ | .05 |
| $Na_2O$ | 9.99 |
| $Fe_2O_3$ | .03 |
| $ThO_2$ | 29.98 |
| $K_2O$ | 9.99 |

Example VI

| | |
|---|---|
| $SiO_2$ | 44.97 |
| $Al_2O_3$ | .05 |
| $Na_2O$ | 9.99 |
| $Fe_2O_3$ | .02 |
| $K_2O$ | 9.99 |
| $ThO_2$ | 29.98 |
| $V_2O_5$ | 5.00 |

Example VII

| | Percent |
|---|---|
| $SiO_2$ | 49.96 |
| $Al_2O_3$ | .05 |
| $Na_2O$ | 7.49 |
| $Fe_2O_3$ | .03 |
| $K_2O$ | 7.49 |
| $ThO_2$ | 29.98 |
| $V_2O_5$ | 5.00 |

Example VIII

| | |
|---|---|
| $SiO_2$ | 44.97 |
| $Al_2O_3$ | .05 |
| $Na_2O$ | 7.49 |
| $Fe_2O_3$ | .02 |
| $K_2O$ | 7.49 |
| $ThO_2$ | 29.98 |
| $V_2O_5$ | 9.99 |

Example IX

| | |
|---|---|
| $SiO_2$ | 69.92 |
| $Al_2O_3$ | .07 |
| $Na_2O$ | 19.98 |
| $Fe_2O_3$ | .04 |
| $ThO_2$ | 9.99 |

Example X

| | |
|---|---|
| $SiO_2$ | 64.94 |
| $Al_2O_3$ | .07 |
| $Na_2O$ | 24.98 |
| $Fe_2O_3$ | .03 |
| $ThO_2$ | 9.99 |

Example XI

| | |
|---|---|
| $SiO_2$ | 59.95 |
| $Al_2O_3$ | .06 |
| $Na_2O$ | 29.97 |
| $Fe_2O_3$ | .03 |
| $ThO_2$ | 9.99 |

Bushing operating temperature 2200° F.
Fiber diameter .00014".

Example XII

| | Percent |
|---|---|
| $SiO_2$ | 54.95 |
| $Al_2O_3$ | .06 |
| $Na_2O$ | 34.97 |
| $Fe_2O_3$ | .03 |
| $ThO_2$ | 9.99 |

Example XIII

| | |
|---|---|
| $SiO_2$ | 64.94 |
| $Al_2O_3$ | .06 |
| $Na_2O$ | 19.98 |
| $Fe_2O_3$ | .03 |
| $ThO_2$ | 14.99 |

Example XIV

| | |
|---|---|
| $SiO_2$ | 59.95 |
| $Al_2O_3$ | .06 |
| $Na_2O$ | 24.98 |
| $Fe_2O_3$ | .03 |
| $ThO_2$ | 14.99 |

Example XV

| | |
|---|---|
| $SiO_2$ | 54.95 |
| $Al_2O_3$ | .06 |
| $Na_2O$ | 29.97 |
| $Fe_2O_3$ | .03 |
| $ThO_2$ | 14.99 |

Bushing operating temperature 1970° F.
Fiber diameter .00016".

Example XVI

| | Percent |
|---|---|
| $SiO_2$ | 49.96 |
| $Al_2O_3$ | .05 |
| $Na_2O$ | 34.97 |
| $Fe_2O_3$ | .03 |
| $ThO_2$ | 14.99 |

Example XVII

| | |
|---|---|
| $SiO_2$ | 49.97 |
| $Al_2O_3$ | .05 |
| $Na_2O$ | 34.98 |
| $Fe_2O_3$ | .02 |
| $F_2$ | 5.00 |
| $ThO_2$ | 14.99 |

Example XVIII

| | |
|---|---|
| $SiO_2$ | 49.97 |
| $Al_2O_3$ | .05 |
| $Na_2O$ | 29.98 |
| $Fe_2O_3$ | .02 |
| $ThO_2$ | 19.99 |
| $F_2$ | 5.00 |

Bushing operating temperature 1700° F.
Fiber diameter .00016".

Example XIX

| | Percent |
|---|---|
| $SiO_2$ | 47.33 |
| $Al_2O_3$ | .05 |
| $Na_2O$ | 7.89 |
| $Fe_2O_3$ | .02 |
| $K_2O$ | 7.89 |
| $ThO_2$ | 26.30 |
| $V_2O_5$ | 10.52 |

Example XX

| | |
|---|---|
| $SiO_2$ | 47.59 |
| $Al_2O_3$ | .05 |
| $Na_2O$ | 23.79 |
| $Fe_2O_3$ | .02 |
| $ThO_2$ | 23.79 |
| $F_2$ | 4.76 |

Example XXI

| | |
|---|---|
| $SiO_2$ | 47.59 |
| $Al_2O_3$ | .05 |
| $Na_2O$ | 19.04 |
| $Fe_2O_3$ | .02 |
| $ThO_2$ | 28.55 |
| $F_2$ | 4.76 |

Example XXII

| | |
|---|---|
| $SiO_2$ | 52.34 |
| $Al_2O_3$ | .05 |
| $Na_2O$ | 14.27 |
| $Fe_2O_3$ | .03 |
| $ThO_2$ | 28.55 |
| $F_2$ | 4.76 |

Example XXIII

| | |
|---|---|
| $SiO_2$ | 44.97 |
| $Al_2O_3$ | .05 |
| $Na_2O$ | 5.00 |
| $Fe_2O_3$ | .02 |
| $K_2O$ | 5.00 |
| $ThO_2$ | 29.98 |
| $V_2O_5$ | 14.99 |

Example XXIV

| | |
|---|---|
| $SiO_2$ | 42.83 |
| $Al_2O_3$ | .05 |
| $Na_2O$ | 4.76 |
| $Fe_2O_3$ | .02 |
| $K_2O$ | 4.76 |
| $ThO_2$ | 28.55 |
| $V_2O_5$ | 14.28 |
| $F_2$ | 4.76 |

Example XXV

| | Percent |
|---|---|
| $SiO_2$ | 44.97 |
| $Al_2O_3$ | .05 |
| $Na_2O$ | 5.00 |
| $Fe_2O_3$ | .02 |
| $K_2O$ | 5.00 |
| $ThO_2$ | 29.98 |
| $V_2O_5$ | 9.99 |
| $ZnO$ | 5.00 |

Example XXVI

| | |
|---|---|
| $SiO_2$ | 44.97 |
| $Al_2O_3$ | .05 |
| $Na_2O$ | 5.00 |
| $Fe_2O_3$ | .02 |
| $K_2O$ | 5.00 |
| $ThO_2$ | 29.98 |
| $V_2O_5$ | 9.99 |
| $SnO_2$ | 5.00 |

Example XXVII

| | |
|---|---|
| $SiO_2$ | 53.62 |
| $Al_2O_3$ | .05 |
| $Na_2O$ | 9.75 |
| $Fe_2O_3$ | .03 |
| $ThO_2$ | 34.12 |
| $F_2$ | 2.44 |

Examples III, XI, XV and XVIII provided good fibers suitable for the purposes of this invention. Silica, soda and thoria are considered essential ingredients in all these compositions. A partial substitution of potassia for soda can be made as is illustrated in many of the examples. It has been found that the partial substitution of potassia for soda allows high percentages of thoria to be added without obtaining an opal glass as the resulting product.

Example XXVIII

| | Percent |
|---|---|
| $SiO_2$ | 44.97 |
| $Al_2O_3$ | .05 |
| $Na_2O$ | 14.99 |
| $U_3O_8$ | 34.98 |
| $Fe_2O_3$ | .02 |
| $ThO_2$ | 5.00 |

This is a clear black glass as are the compositions of Examples XXIX to XXXIII.

Example XXIX

| | Percent |
|---|---|
| $SiO_2$ | 44.97 |
| $Al_2O_3$ | .05 |
| $Na_2O$ | 14.99 |
| $U_3O_8$ | 29.98 |
| $Fe_2O_3$ | .02 |
| $ThO_2$ | 14.99 |

Example XXX

| | |
|---|---|
| $SiO_2$ | 44.97 |
| $Al_2O_3$ | .05 |
| $Na_2O$ | 14.99 |
| $U_3O_8$ | 24.98 |
| $Fe_2O_3$ | .02 |
| $ThO_2$ | 14.99 |

Example XXXI

| | |
|---|---|
| $SiO_2$ | 39.98 |
| $Al_2O_3$ | .04 |
| $Na_2O$ | 14.99 |
| $U_3O_8$ | 39.98 |
| $Fe_2O_3$ | .02 |
| $ThO_2$ | 5.00 |

Example XXXII

| | Percent |
|---|---|
| $SiO_2$ | 34.98 |
| $Al_2O_3$ | .04 |
| $Na_2O$ | 14.99 |
| $U_3O_8$ | 39.98 |
| $Fe_2O_3$ | .02 |
| $ThO_2$ | 9.99 |

Example XXXIII

| | |
|---|---|
| $SiO_2$ | 29.99 |
| $Al_2O_3$ | .03 |
| $Na_2O$ | 14.99 |
| $U_3O_8$ | 39.98 |
| $Fe_2O_3$ | .02 |
| $ThO_2$ | 14.99 |

Example XXXIV

| | |
|---|---|
| $SiO_2$ | 44.97 |
| $Al_2O_3$ | .05 |
| $Na_2O$ | 14.99 |
| $U_3O_8$ | 19.99 |
| $Fe_2O_3$ | .02 |
| $ThO_2$ | 19.99 |

Example XXXV

| | |
|---|---|
| $SiO_2$ | 24.99 |
| $Al_2O_3$ | .03 |
| $Na_2O$ | 10.00 |
| $U_3O_8$ | 39.98 |
| $Fe_2O_3$ | .01 |
| $ThO_2$ | 19.99 |
| $V_2O_5$ | 5.00 |

Example XXXVI

| | |
|---|---|
| $SiO_2$ | 55.95 |
| $Al_2O_3$ | .06 |
| $Na_2O$ | 23.98 |
| $U_3O_8$ | 9.99 |
| $Fe_2O_3$ | .03 |
| $ThO_2$ | 9.99 |

Bushing operating temperature 2250° F.
Fiber diameter .00012".

Example XXXVII

| | Percent |
|---|---|
| $SiO_2$ | 55.95 |
| $Al_2O_3$ | .06 |
| $Na_2O$ | 23.98 |
| $U_3O_8$ | 5.00 |
| $Fe_2O_3$ | .03 |
| $ThO_2$ | 14.99 |

Bushing operating temperature 2300° F.
Fiber diameter .00015".

Example XXXVIII

| | Percent |
|---|---|
| $SiO_2$ | 47.59 |
| $Al_2O_3$ | .05 |
| $Na_2O$ | 14.28 |
| $Fe_2O_3$ | .02 |
| $ThO_2$ | 33.31 |
| $F_2$ | 4.76 |

Bushing operating temperature 2200° F.
Fiber diameter .00013".

These latter examples, with the exception of Example XXXVIII, set forth fiberizable compositions comprising both thoria and urania. Although not equivalent oxides in every aspect, it has been found that urania can be added to the thoria glass compositions in an effort to increase the total radio-active material and still retain the proper viscosity-tempreature relationship for fiberizing.

Various modifying oxides can be added to the compositions but they are not deemed to be essential. For instance, vanadia, zirconia, tin oxide, lead oxide, and zinc oxide can be added. Vanadia allows the addition of high proportions of thoria while retaining the proper viscosity-temperature relationship to allow fiberization. It has also been found that fluorides can be added to the glass composition. The fluorine can be added in the form of sodium silicofluoride or other suitable material such as calcium fluoride and others. It was found that an addition of approximately 5% $F_2$ appeared to be the optimum proportion. Up to ½ of the fluorine added is lost during melting; however, the ½ to ⅔ portion remaining in the glass provided the desired result. An addition of $F_2$ made it possible to increase the thoria content without resulting in an opal glass and still retaining an operable glass composition having as much as 33.3% thoria present. The vast majority of these compositions were melted at a temperature of from 2650–2750° F. One exception was the composition of Example VI which was melted at 2850° F. Many of the compositions disclosed have been found to be leachable by acid to produce high temperature resistant glass fibers.

Although bushing operating temperatures and fiber diameters have been indicated, these are not limits but merely indicative.

Modifications and variations within the scope of the appended claims are intended to be included.

I claim:

1. A glass composition consisting essentially of by weight, 69.93% $SiO_2$, .07% $Al_2O_3$, 9.99% $Na_2O$, .03% $Fe_2O_3$, and 19.98% $ThO_2$.

2. A glass composition consisting essentially of by weight, 59.95% $SiO_2$, .06% $Al_2O_3$, 19.98% $Na_2O$, .03% $Fe_2O_3$, and 19.98% $ThO_2$.

3. A glass composition consisting essentially of by weight, 49.86% $SiO_2$, .05% $Al_2O_3$, 29.98% $Na_2O$, .02% $Fe_2O_3$, and 19.99% $ThO_2$.

4. A glass composition consisting essentially of by weight, 59.95% $SiO_2$, .06% $Al_2O_3$, 9.99% $Na_2O$, .03% $Fe_2O_3$, and 29.97% $ThO_2$.

5. A glass composition consisting essentially of by weight, 49.96% $SiO_2$, .05% $Al_2O_3$, 9.99% $Na_2O$, .03% $Fe_2O_3$, 29.98% $ThO_2$, and 9.99% $K_2O$.

6. A glass composition consisting essentially of by weight, 44.97% $SiO_2$, .05% $Al_2O_3$, 9.99% $Na_2O$, .02% $Fe_2O_3$, 9.99% $K_2O$, 29.98% $ThO_2$, and 5.00% $V_2O_5$.

7. A glass composition consisting essentially of by weight, 49.96% $SiO_2$, .05% $Al_2O_3$, 7.49% $Na_2O$, .03% $Fe_2O_3$, 7.49% $K_2O$, 29.98% $ThO_2$, and 5.00% $V_2O_5$.

8. A glass composition consisting essentially of by weight, 39.98% $SiO_2$, .04% $Al_2O_3$, 7.50% $Na_2O$, .02% $Fe_2O_3$, 7.50% $K_2O$, 29.98% $ThO_2$, and 14.99% $V_2O_5$.

9. A glass composition consisting essentially of by weight, 69.92% $SiO_2$, .07% $Al_2O_3$, 19.98% $Na_2O$, .04% $Fe_2O_3$, and 9.99% $ThO_2$.

10. A glass composition consisting essentially of by weight, 64.94% $SiO_2$, .07% $Al_2O_3$, 24.98% $Na_2O$, .03% $Fe_2O_3$, and 9.99% $ThO_2$.

11. A glass composition consisting essentially of by weight, 59.95% $SiO_2$, .06% $Al_2O_3$, 29.97% $Na_2O$, .03% $Fe_2O_3$, and 9.99% $ThO_2$.

12. A glass composition consisting essentially of by weight, 54.95% $SiO_2$, .06% $Al_2O_3$, 34.97% $Na_2O$, .03% $Fe_2O_3$, and 9.99% $ThO_2$.

13. A glass composition consisting essentially of by weight, 64.94% $SiO_2$, .06% $Al_2O_3$, 19.98% $Na_2O$, .03% $Fe_2O_3$, and 14.99% $ThO_2$.

14. A glass composition consisting essentially of by weight, 59.95% $SiO_2$, .06% $Al_2O_3$, 24.98% $Na_2O$, .03% $Fe_2O_3$, and 14.99% $ThO_2$.

15. A glass composition consisting essentially of by weight, 54.95% $SiO_2$, .06% $Al_2O_3$, 29.97% $Na_2O$, .03% $Fe_2O_3$, and 14.99% $ThO_2$.

16. A glass composition consisting essentially of by weight, 49.96% $SiO_2$, .05% $Al_2O_3$, 34.97% $Na_2O$, .03% $Fe_2O_3$, and 14.99% $ThO_2$.

17. A glass composition consisting essentially of by weight, 49.97% $SiO_2$, .05% $Al_2O_3$, 34.98% $Na_2O$, .02% $Fe_2O_3$, 5.00% $F_2$, and 14.99% $ThO_2$.

18. A glass composition consisting essentially of by weight, 49.97% $SiO_2$, .05% $Al_2O_3$, 29.98% $Na_2O$, .02% $Fe_2O_3$, 19.99% $ThO_2$, and 5.00% $F_2$.

19. A glass composition consisting essentially of by weight, 47.33% $SiO_2$, .05% $Al_2O_3$, 7.89% $Na_2O$, .02% $Fe_2O_3$, 7.89% $K_2O$, 26.30% $ThO_2$, and 10.52% $V_2O_5$.

20. A glass composition consisting essentially of by weight, 47.59% $SiO_2$, .05% $Al_2O_3$, 23.79% $Na_2O$, .02% $Fe_2O_3$, 23.79% $ThO_2$, and 4.76% $F_2$.

21. A glass composition consisting essentially of by weight, 47.59% $SiO_2$, .05% $Al_2O_3$, 19.04% $Na_2O$, .02% $Fe_2O_3$, 28.55% $ThO_2$, and 4.76% $F_2$.

22. A glass composition consisting essentially of by weight, 52.34% $SiO_2$, .05% $Al_2O_3$, 14.27% $Na_2O$, .03% $Fe_2O_3$, 28.55% $ThO_2$, and 4.76% $F_2$.

23. A glass composition consisting essentially of by weight, 44.97% $SiO_2$, .05% $Al_2O_3$, 5.00% $Na_2O$, .02% $Fe_2O_3$, 5.00% $K_2O$, 29.98% $ThO_2$, and 14.99% $V_2O_5$.

24. A glass composition consisting essentially of by weight, 42.83% $SiO_2$, .05% $Al_2O_3$, 4.76% $Na_2O$, .02% $Fe_2O_3$, 4.76% $K_2O$, 28.55% $ThO_2$, 14.28% $V_2O_5$, and 4.76% $F_2$.

25. A glass composition consisting essentially of by weight, 44.97% $SiO_2$, .05% $Al_2O_3$, 5.00% $Na_2O$, .02% $Fe_2O_3$, 5.00% $K_2O$, 29.98% $ThO_2$, 9.99% $V_2O_5$, and 5.00% $ZnO$.

26. A glass composition consisting essentially of by weight, 44.97% $SiO_2$, .05% $Al_2O_3$, 5.00% $Na_2O$, .02% $Fe_2O_3$, 5.00% $K_2O$, 29.98% $ThO_2$, 9.99% $V_2O_5$, and 5.00% $SnO_2$.

27. A glass composition consisting essentially of by weight, 53.62% $SiO_2$, .05% $Al_2O_3$, 9.75% $Na_2O$, .03% $Fe_2O_3$, 34.12% $ThO_2$, and 2.44% $F_2$.

28. Glass composition consisting essentially of by weight, 44.97% $SiO_2$, 0.05% $Al_2O_3$, 14.99% $Na_2O$, 34.98% $U_3O_8$, 0.02% $Fe_2O_3$, and 5.00% $ThO_2$.

29. Glass composition consisting essentially of by weight, 44.97% $SiO_2$, 0.05% $Al_2O_3$, 14.99% $Na_2O$, 29.98% $U_3O_8$, 0.02% $Fe_2O_3$, and 14.99% $ThO_2$.

30. Glass composition consisting essentially of by weight, 44.97% $SiO_2$, 0.05% $Al_2O_3$, 14.99% $Na_2O$, 24.98% $U_3O_8$, 0.02% $Fe_2O_3$, and 14.99% $ThO_2$.

31. Glass composition consisting essentially of by weight, 39.98% $SiO_2$, 0.04% $Al_2O_3$, 14.99% $Na_2O$, 39.98% $U_3O_8$, 0.02% $Fe_2O_3$, and 5.00% $ThO_2$.

32. Glass composition consisting essentially of by weight, 34.98% $SiO_2$, 0.04% $Al_2O_3$, 14.99% $Na_2O$, 39.98% $U_3O_8$, 0.02% $Fe_2O_3$, and 9.99% $ThO_2$.

33. Glass composition consisting essentially of by weight, 29.99% $SiO_2$, 0.03% $Al_2O_3$, 14.99% $Na_2O$, 39.98% $U_3O_8$, 0.02% $Fe_2O_3$, and 14.99% $ThO_2$.

34. Glass composition consisting essentially of by weight, 44.97% $SiO_2$, 0.05% $Al_2O_3$, 14.99% $Na_2O$, 19.99% $U_3O_8$, 0.02% $Fe_2O_3$, and 19.99% $ThO_2$.

35. Glass composition consisting essentially of by weight, 24.99% $SiO_2$, 0.03% $Al_2O_3$, 10.00% $Na_2O$, 39.98% $U_3O_8$, 0.01% $Fe_2O_3$, 19.99% $ThO_2$, and 5.00% $V_2O_5$.

36. Glass composition consisting essentially of by weight, 55.95% $SiO_2$, 0.06% $Al_2O_3$, 23.98% $Na_2O$, 9.99% $U_3O_8$, 0.03% $Fe_2O_3$, and 9.99% $ThO_2$.

37. Glass composition consisting essentially of by weight, 55.95% $SiO_2$, 0.06% $Al_2O_3$, 23.98% $Na_2O$, 5.00% $U_3O_8$, 0.03% $Fe_2O_3$, and 14.99% $ThO_2$.

38. Glass composition consisting essentially of by weight, 47.59% $SiO_2$, 0.05% $Al_2O_3$, 14.28% $Na_2O$, 0.02% $Fe_2O_3$, 33.31% $ThO_2$, and 4.76% $F_2$.

39. Glass composition suitable for fiberizing comprising 24–70% $SiO_2$, 5–35% $Na_2O$, and 5–35% $ThO_2$, all percentages being by weight.

40. Fibers comprising the glass composition of claim 39.

41. Glass compositions comprising 24–56% $SiO_2$, 10–24% $Na_2O$, 5–20% $ThO_2$ and a sufficient quantity of $U_3O_8$ to increase the radio-active material and still retain fiberizability.

42. Fibers comprising the glass compositions of claim 41.

References Cited in the file of this patent

UNITED STATES PATENTS

| | | |
|---|---|---|
| 2,199,856 | Partridge | May 7, 1940 |
| 2,406,580 | Bastick et al. | Aug. 27, 1946 |
| 2,552,125 | Tillyer | May 8, 1951 |
| 2,928,780 | Harteck et al. | Mar. 15, 1960 |
| 3,060,041 | Loewenstein | Oct. 23, 1962 |
| 3,084,054 | Tiede | Apr. 2, 1963 |

FOREIGN PATENTS

| | | |
|---|---|---|
| 688,148 | Germany | Feb. 14, 1940 |
| 793,866 | Great Britain | Apr. 23, 1958 |